Aug. 8, 1950

L. GREENBERG 2,517,659

SPECTRAL PHOTOGRAPHIC SOUND APPARATUS AND RECORD

Filed Jan. 15, 1946

2 Sheets-Sheet 1

Inventor
Leonard Greenberg,
By McMorrow, Berman & Davidson
Attorneys

Inventor
Leonard Greenberg,

By McMorrow, Berman & Davidson
Attorneys

Patented Aug. 8, 1950

2,517,659

UNITED STATES PATENT OFFICE 2,517,659

SPECTRAL PHOTOGRAPHIC SOUND APPARATUS AND RECORD

Leonard Greenberg, Oneonta, N. Y.

Application January 15, 1946, Serial No. 641,219

3 Claims. (Cl. 179—100.3)

This invention relates to sound recording and reproducing and more particularly to a method and means of recording and reproducing sound utilizing a beam of light and the photoelectric effect.

A main object of the invention is to provide a novel and improved method and means of recording sound on film and reproducing the recorded sound, said method and means employing frequency modulation of light beam components rather than intensity variation of the beam in producing and reproducing the film record.

A further object of the invention is to provide an improved system of sound recording on film wherein the total intensity of light impinging on the sound track remains substantially constant both in modulation, when producing a track, and in subsequent reproduction.

A still further object of the invention is to provide an improved sound recording and reproducing system wherein the audio signals are recorded on a film track in the form of a substantially constant width spectral band having colored striations representing the dispersed components of a beam of white light refracted through a prism, said prism being positioned in the neighborhood of the angle of minimum deviation for certain of the beam components so that differential color effects are produced on the film held in the path of the refracted beam responsive to vibration of the prism.

A still further object of the invention is to provide an improved sound recording and reproducing system wherein a sound record is produced on a color sensitized moving film by the color modulation of a recording light beam projected onto the film, said color modulation in the beam closely corresponding to sound modulation impressed on the modulating element of the system, and wherein the recorded color modulations are translated into sound by passing a beam of white light through the developed color-modulated film strip, said beam impinging on a light sensitive device adapted to generate a varying electrical potential responsive to the variation in wavelength composition of light impinging thereon.

Further objects and advantages of the invention will become apparent from the following description and claims, and from the accompanying drawings, wherein:

In many of the present systems of sound recording and reproducing, variation of track density or of track width is relied upon to produce the sound record on film, and in reproduction light is passed through the film track, thereby modulating the light beam either as to intensity or width in accordance with the film record. The modulated light beam then impinges on a photoelectric cell which develops a varying potential in accordance with the variations in beam width or intensity. The present systems have many practical disadvantages such as, discrimination of some of the component parts against certain audible frequencies in the working range, introduction of false harmonics, definite limitations on amplitude both in recording and reproduction, phase distortion and general tendencies to produce distortion and noise. In the system of this invention there is no substantial variation of light intensity on the photoelectric element during reproduction. Both in recording and in subsequent reproduction the intensity and width of the light beam, which is the transfer medium of the audio signals, remain substantially constant. According to this invention the impressed sound is translated into a strip of spectrally colored film wherein the variations in color band concentration and definition correspond to the variations in sound intensity impressed on the recording element of the system. In reproducing, the color variations of the moving strip are employed to color-modulate a light beam which impinges on a photoelectric cell having peak sensitivity at a localized wavelength or narrow band of wavelengths in the visible radiation spectrum. The variation in color of the impinging beam thus produces a variation in the electrical response generated by the photoelectric cell. This variation in electrical response is suitably amplified and converted into audible sounds by conventional means.

Figure 1:
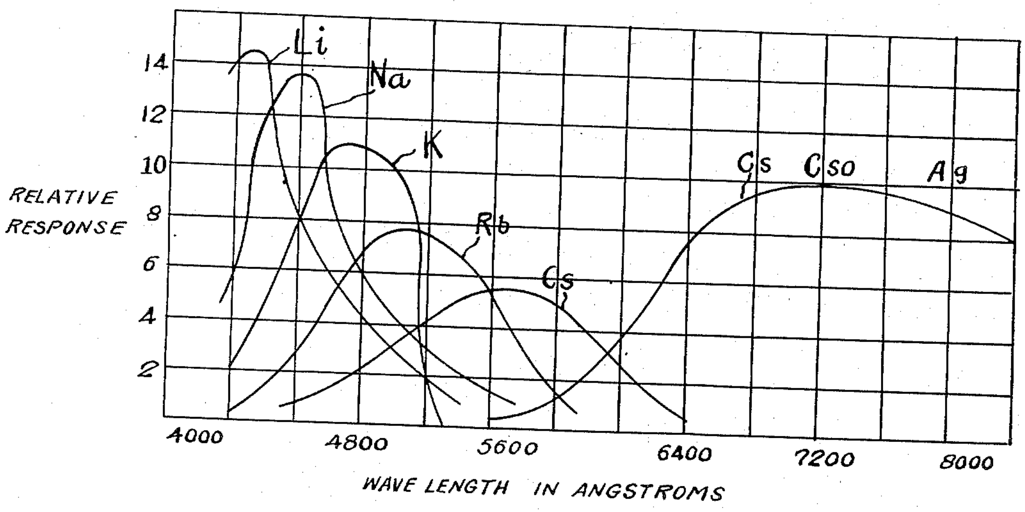
Figure 1 is a graph illustrating relative response potential curves for various photo sensitive substances expressed in terms of wavelength of incident radiation.

Figure 1 discloses graphically the photo-electric emission characteristics of a number of alkali metals expressed in terms of their relative response as a function of wavelength of applied visible radiation. As shown by these curves, lithium has a peak color sensitivity at about 4100 Angstroms and is attenuated sharply at each side of its maximum point, cutting off entirely for visible light at about 5250 Angstroms. Similarly, sodium, potassium, rubidium and caesium exhibit well-defined peak sensitivities at local regions in the visible spectrum. The combination of caesium, caesium oxide and silver whose color sensitivity characteristic is shown at the right side of the graph also exhibits a peak sensitivity at about 7200 Angstroms.

From the above discussion it is clear that if a beam of radiation having a given intensity is dispersed and a spectrum is produced, a certain normal response will be obtained from photoelectric surfaces having the above characteristics, where said surfaces are located so as to be illuminated by these respective color components of the beam to which they are sensitive. If the normal spatial distribution of the color components is altered, the responses of the respective photoelectric surfaces will change in accordance with the changes in the color composition of the radiation impinging thereon. Where an initially well defined spectrum of given intensity is produced, such as is obtained by passing white light through a triangular prism, and the photoelectric surfaces are located in fixed positions in the respective bands where they have maximum response, the response may be attenuated by mixing up the bands to produce a diffused beam, even if the original net intensity is unchanged.

Figures 2, 4:
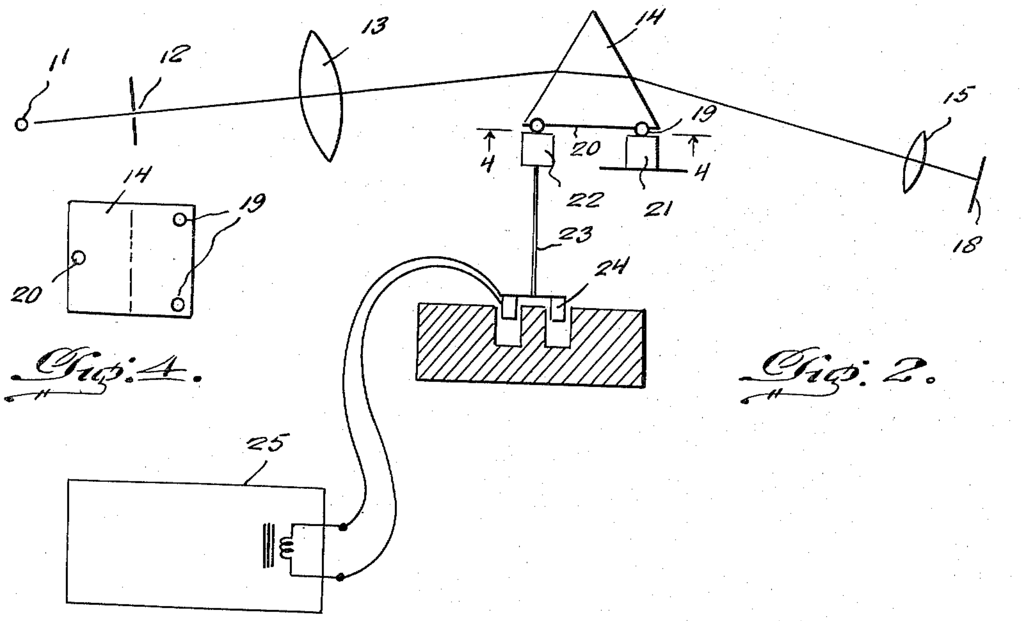
Figure 2 is a simplified diagram of a color modulating device for recording sound variations on film constructed in accordance with the present invention.
Figure 4 is a detail view taken on line 4—4 of Figure 2.

To utilize this effect for sound recording it is necessary to provide means for diffusing the bands in a very definite manner on the record medium, which, as employed herein, is a color sensitive film strip. Referring to Figure 2, 11 designates a source of white light, 12 is a collimator slit through which the light beam is passed, 13 is a lens, slit 12 being located at the principal focal point of lens 13, 14 is a triangular prism through which the light beam is refracted, and 15 is a second lens through which the refracted beam passes and is focussed on a color sensitive film strip 18. Embedded rigidly in the bottom surface of prism 14 adjacent the rear corners thereof are a pair of highly polished steel bearings 19, 19. A similar bearing 20 is rigidly embedded in the center portion of said bottom surface adjacent the front edge thereof. Bearings 19, 19 are each supported by a stationary magnet 21 having a highly polished bearing surface. Magnets 21 may be of Alnico steel or other suitable permanently magnetized material. Bearing 20 is supported on a magnet 22, of Alnico steel or the like having a highly polished bearing surface, magnet 22 being rigidly secured by a non-magnetic rod 23 to a movable voice coil 24, such as the voice coil of a standard high quality reproducer unit. Voice coil 24 is connected to the output terminals of a high fidelity audio amplifier 25, said amplifier having an appropriate sound input device, such as a microphone, for converting sound energy into electrical impulses. The respective moving parts are designed to be easily driven by the amplifier output energy. The strength of magnets 21 and 22 may be varied to provide the proper amount of damping for best recording.

Prism 14 is positioned with respect to the incident beam of white light so that when it is at rest the refracted beam is diffused to a maximum degree. This position is obtained by locating the angle of minimum deviation for the longest wavelength, at which diffusion begins, and then gradually increasing the angle of incidence until substantially complete blending or diffusion of the spectral bands is obtained. It is then apparent from Figure 2 that a downward deflection of coil 24 responsive to an audio impulse from amplifier 25 will cause prism 14 to rotate counterclockwise about bearings 19, 19 to decrease the angle of incidence of the beam to thereby diminish the degree of diffusion of the refracted portion thereof which impinges on film 18. A very loud audio impulse will rotate prism 14 to the position approaching minimum deviation of the longer wave lengths, causing the spectral bands to become relatively well defined, whereas a less intense audio impulse will produce a lesser degree of clear definition of the spectral bands. Film strip 18 is thus exposed to varying degrees of spectral definition in accordance with the amplitude of the audio signals delivered to coil 24 from the output terminals of amplifier 25.

Figures 3, 5, 6:
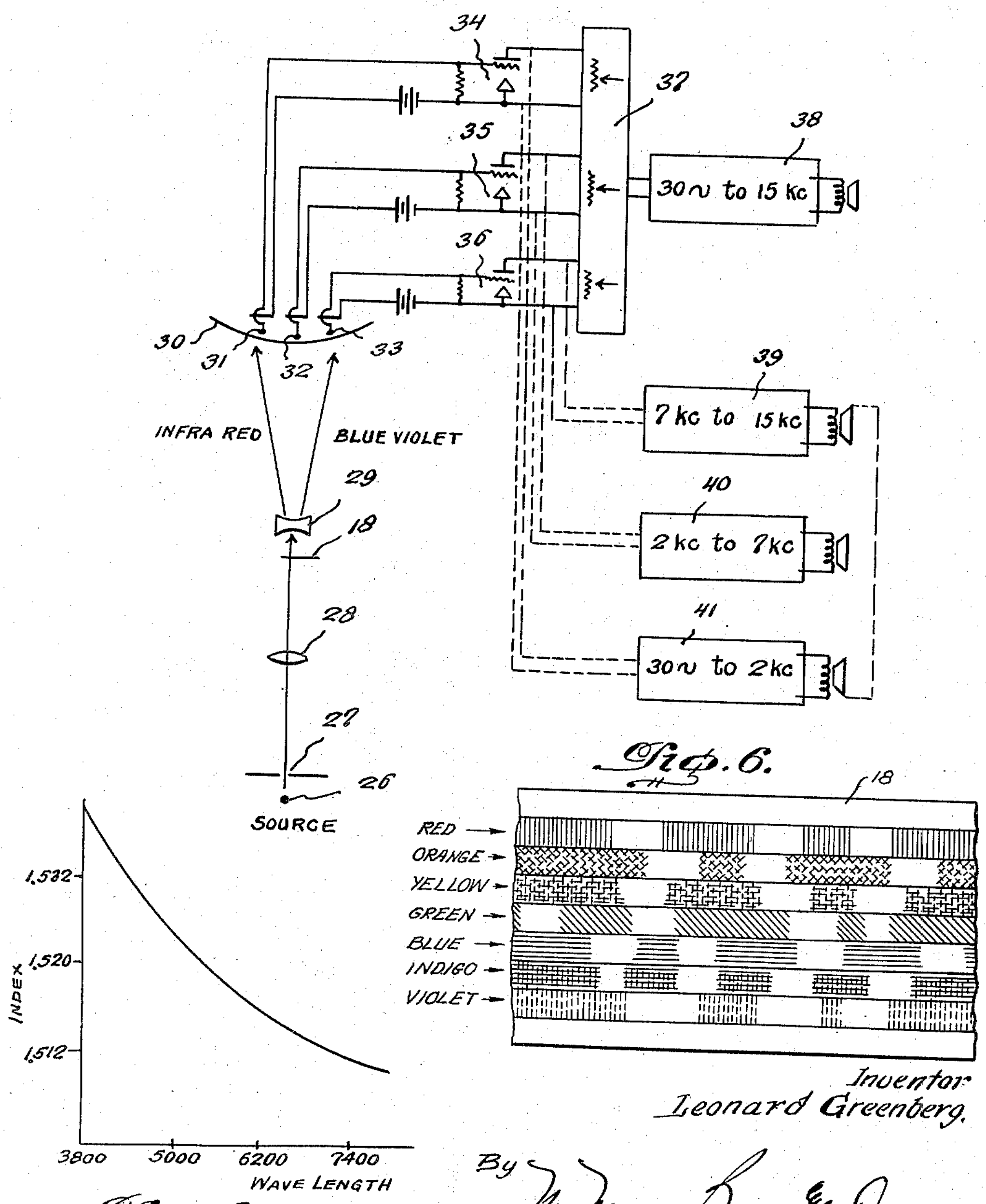
Figure 3 is a simplified diagram of a system for reproducing color modulations on film such as derived from the device of Figure 2.
Figure 5 is a graph showing the variation of the index of refraction of crown glass as a function of wavelength.
Figure 6 is a fragmentary enlarged plan view illustrating a portion of a film record obtained by the method of the present invention.

Diffusion of the spectral bands as the angle of incidence is increased beyond the angle of minimum deviation for the longest wave length is caused by the variation of the index of refraction of optical glass, such as crown glass, as a function of wavelength, graphically illustrated in Figure 5. The relation between index of refraction and angle of minimum deviation is given by $$N=\frac{\sin\frac{D+A}{2}}{\sin\frac{A}{2}} \qquad (1)$$

where:

N is the index of refraction,
D is the angle of minimum deviation, and
A is the angle of the prism.

Since N for crown glass decreases as the wavelength increases, from Figure 5, $$\sin\frac{D+A}{2}$$

will have its smallest value for the largest wavelength. D for the largest wavelength will be smaller than for the shorter wavelengths. This means that as the angle of incidence is increased beyond the angle of minimum deviation for the largest wavelength, angles of minimum deviation for shorter wavelengths are successively passed through, causing mixing up of the spectral bands in the refracted beam and producing progressively increasing degrees of diffusion until a maximum degree of diffusion is reached. The angle of incidence at this point corresponds to the position of minimum excitation of the prism by the amplifier.

The audio signals therefore produce on film 18 a continuous variable spectrum band, as shown in Figure 6, running along the length of the film, said band being substantially constant in width but having colored striations varying from a substantially dispersed condition for signals of high intensity wherein the striations are clearly separated and of concentrated color content, to a substantially diffused condition for signals of low intensity wherein the striations are blended together and have little individual color value, with varying intermediate degrees of diffusion of the striations corresponding to the signal modulations. Each condition of color definition of the striations is the result of a particular sound intensity.

A reproducing device for reproducing the recorded sound impulses is schematically shown in Figure 3, wherein 26 designates a source of white light which passes through a collimator slit 27 and thence through a lens 28 at whose principal focal point slit 27 is located. The beam is passed through the developed record film 18 carrying the spectral striations and is color-modulated thereby. The color-modulated beam is then passed through a diverging concave lens 29 to spread out the striations and the radiation is directed onto a photo-cell 30 having a plurality of photo sensitive cathodes 31, 32 and 33 spatially arranged with respect to the expanded impinging beam, and each located at a point corresponding to the location of the spectral color for which it has peak sensitivity were the expanded impinging beam a clearly dispersed spectral band. Thus, cathode 31 may be of caesium, caesium oxide and silver, having peak sensitivity to red and infra red, cathode 32 may be of caesium which has peak sensitivity to the middle wavelengths, and cathode 33 may be of sodium, having peak sensitivity to the short wave lengths in the blue region. Connected to each photo sensitive element is an individual amplifier, element 31 being connected to an amplifier 34, element 32 being connected to an amplifier 35, and element 33 being connected to an amplifier 36. Amplifiers 34, 35 and 36 are in turn connected to a high fidelity audio mixer 37 which in turn is connected to a wide range final amplifier 38. As an alternative, amplifier 34 may be connected to a high range, high fidelity amplifier 39, amplifier 35 to a medium range high fidelity amplifier 40, and amplifier 36 to a low range high fidelity amplifier 41, the three high fidelity amplifiers together covering the entire audio spectrum from 30 cycles to 15,000 cycles with maximum quality of performance.

It will be noted that each of the photo sensitive elements 31, 32 and 33 functions as a separate and independent pickup device, each responding to a separate recording of the same audio modulations. If desired, only one photo sensitive device may be employed as the pickup-element, in which event a mixing stage would be unnecessary. However, the present system especially lends itself to the employment of multiple pickup elements, whereby each pickup element may handle a limited audio range, as described in connection with Figure 3, so that the total output of the pickup amplifiers may provide a quality of reproduction much superior to that obtained in present systems.

While certain specific embodiments of methods and means for sound recording and reproducing have been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A method of sound recording comprising the steps of refracting a beam of light through a prism at an angle of incidence D approximately equal to the angle of minimum deviation of a spectral component of the beam and which is substantially defined by the equation $$N=\frac{\sin\frac{D+A}{2}}{\sin\frac{A}{2}}$$

where N is the index of refraction of the prism for said spectral component and A is the angle of the prism, vibrating said prism in accordance with sound vibrations, whereby the degree of diffusion of the spectral components emerging from the prism is varied in accordance with said sound vibrations, and projecting said emerging spectral components onto a moving color-reproducing film.

2. A sound record comprising a strip of film material having thereon a longitudinal band of spectrally colored striations containing all the color components of white light, said striations varying longitudinally in degree of distinct color definition from sharply defined portions of relatively intense spectral colors to substantially diffused portions of relatively indistinct color, the sum of the color components capable of being transmitted through the film strip yielding white light at any transverse portion along the strip.

3. A sound reproducing system comprising a source of white light, means for color-modulating said source comprising a strip of film material having thereon a longitudinal straight band of spectrally colored striations containing all the components of white light, said striations varying longitudinally in degree of distinct color definition from sharply defined portions of relatively intense spectral colors to substantially diffused portions of relatively indistinct color, in accordance with the amplitude of sound energy modulations, and means for projecting light from said source through said strip, whereby to produce a spectral beam having spectral striations varying in degree of diffusion in accordance with the amplitude of said sound energy modulations, a plurality of photo-cells exposed to said spectral beam, each photo-cell being physically positioned at a location corresponding to the location of the spectral component of the beam for which it has peak sensitivity, an amplifier connected to each photo-cell, means for mixing the outputs of the respective amplifiers, and a sound reproducing device connected to the output of the mixing means.

LEONARD GREENBERG.

REFERENCES CITED

The following references are of record in the file of this patent:

UNITED STATES PATENTS

| Number | Name | Date |
|---|---|---|
| 1,709,926 | Weaver | Apr. 23, 1929 |
| 1,769,907 | DeForest | July 1, 1930 |
| 1,777,037 | DeForest | Sept. 30, 1930 |
| 1,928,392 | Oswald et al. | Sept. 26, 1933 |
| 1,971,276 | Roehrich | Aug. 21, 1934 |
| 2,061,016 | Walton | Nov. 17, 1936 |
| 2,136,143 | Michaelis | Nov. 8, 1938 |
| 2,186,157 | Van Leer | Jan. 9, 1940 |
| 2,193,606 | Ulrey | Mar. 12, 1940 |
| 2,278,940 | Murphy | Apr. 7, 1942 |
| 2,292,062 | Dimmick | Aug. 4, 1942 |
| 2,422,778 | Finch | June 24, 1947 |
| 2,423,254 | Rettinger | July 1, 1947 |

FOREIGN PATENTS

| Number | Country | Date |
|---|---|---|
| 554,670 | Germany | July 11, 1932 |
| 488,559 | Great Britain | July 6, 1948 |